United States Patent
Guan et al.

(10) Patent No.: US 12,233,690 B2
(45) Date of Patent: Feb. 25, 2025

(54) CASCADE HEAT PUMP SYSTEM FOR ELECTRIC VEHICLE

(71) Applicant: Kelvin New Energy Technology Co., Ltd., Shanghai (CN)

(72) Inventors: Xinding Guan, Shanghai (CN); Haijun Xie, Shanghai (CN); Henry Xiaoli Huai, Shanghai (CN); Yujun Dong, Shanghai (CN); Gangping Fu, Shanghai (CN)

(73) Assignee: Kelvin New Energy Technology Co., Ltd., Shanghai (CN)

( * ) Notice: Subject to any disclaimer, the term of this patent is extended or adjusted under 35 U.S.C. 154(b) by 317 days.

(21) Appl. No.: 18/081,435

(22) Filed: Dec. 14, 2022

(65) Prior Publication Data

US 2023/0406073 A1  Dec. 21, 2023

(30) Foreign Application Priority Data

Jun. 15, 2022  (CN) .......................... 202210681423.9

(51) Int. Cl.
*B60H 1/32* (2006.01)
*B60H 1/00* (2006.01)

(52) U.S. Cl.
CPC ......... *B60H 1/323* (2013.01); *B60H 1/00278* (2013.01); *B60H 1/00392* (2013.01);
(Continued)

(58) Field of Classification Search
CPC ............ B60H 1/00278; B60H 1/00342; B60H 1/00392; B60H 1/00485; B60H 1/00907;
(Continued)

(56) References Cited

U.S. PATENT DOCUMENTS

| | | | |
|---|---|---|---|
| 2009/0020620 A1* | 1/2009 | Douarre | B60H 1/039 237/12.3 R |
| 2018/0001737 A1* | 1/2018 | Graaf | H01M 10/663 |

(Continued)

FOREIGN PATENT DOCUMENTS

WO   WO-2015136768 A1 *  9/2015  ......... B60H 1/00278

*Primary Examiner* — Joseph F Trpisovsky
(74) *Attorney, Agent, or Firm* — Sandberg Phoenix & von Gontard, PC

(57) ABSTRACT

A cascade heat pump system for an electric vehicle includes a low-pressure-stage compression device, a high-pressure-stage compression device, and a functional heat exchange device. The low-pressure-stage compression device includes a low-pressure-stage compressor, a low-pressure-stage evaporator, a low-pressure expansion valve, and a low-pressure-stage intercooler connected in sequence. The high-pressure-stage compression device includes a high-pressure-stage compressor, a high-pressure-stage four-way valve, an air-side heat exchanger, a water-side heat exchanger, a cabin heat exchanger, and a battery heat exchanger. The compressor outlet of the high-pressure-stage compressor communicates with one of the air-side heat exchanger or the water-side heat exchanger. The air-side heat exchanger communicates with the cabin heat exchanger and the battery heat exchanger separately. The functional heat exchange device includes a motor heat exchange assembly, a heat exchange water tank, a battery heat exchange member, and a cabin heat exchange member.

20 Claims, 6 Drawing Sheets

(52) U.S. Cl.
CPC ....... *B60H 1/00485* (2013.01); *B60H 1/3223* (2013.01); *B60H 1/3227* (2013.01)

(58) Field of Classification Search
CPC ...... B60H 1/143; B60H 1/323; B60H 1/3223; B60H 1/3227; B60H 1/3228; B60H 1/32284; B60H 2001/00307; B60H 2001/00928; B60H 2001/00935; F25B 7/00
See application file for complete search history.

(56) References Cited

U.S. PATENT DOCUMENTS

2021/0387506 A1\* 12/2021 Miyoshi ............. B60H 1/32284
2023/0040535 A1\* 2/2023 Song ................... B60H 1/3211

\* cited by examiner

CASCADE HEAT PUMP SYSTEM FOR ELECTRIC VEHICLE

CROSS-REFERENCE TO RELATED APPLICATION(S)

This application claims priority to Chinese Patent Application No. 202210681423.9 filed Jun. 15, 2022, the disclosure of which is incorporated herein by reference in its entirety.

TECHNICAL FIELD

The present disclosure relates to the technical field of electric vehicles and, in particular, a cascade heat pump system for an electric vehicle.

BACKGROUND

A thermal management system of an electric vehicle is generally composed of a compressor module, a battery heat exchange module, a motor heat exchange module, and a cabin heat exchange module. In summer, a heat exchange circuit formed between the compressor module and the battery heat exchange module, the motor heat exchange module, and the cabin heat exchange module is generally used for cooling the battery, the motor, and the cabin. In winter, a heat exchange circuit formed between the compressor module and the battery heat exchange module, and the cabin heat exchange module is used for heating the battery, the motor, and the cabin. However, in scenarios where the outdoor ambient temperature is relatively low, the existing vehicle thermal management system cannot better satisfy the requirements of use.

SUMMARY

An object of the present disclosure is to provide a cascade heat pump system for an electric vehicle. The cascade heat pump system can better satisfy scenarios where the outdoor ambient temperature is excessively low and can switch the working state according to the outdoor ambient temperature and the operation state of the electric vehicle so that the cascade heat pump system can satisfy the requirements of use in various scenarios.

To achieve the preceding effect, the solutions of the present disclosure are as below.

The present disclosure discloses a cascade heat pump system for an electric vehicle. The system includes a low-pressure-stage compression device, a high-pressure-stage compression device, and a functional heat exchange device. The low-pressure-stage compression device includes a low-pressure-stage compressor, a low-pressure-stage evaporator, a low-pressure expansion valve, and a low-pressure-stage intercooler connected in sequence and has a first working medium circulating in. The high-pressure-stage compression device includes a high-pressure-stage compressor, a high-pressure-stage four-way valve, an air-side heat exchanger, a water-side heat exchanger, a cabin heat exchanger, and a battery heat exchanger and has a second working medium circulating in. The compressor outlet of the high-pressure-stage compressor communicates with one of the air-side heat exchanger or the water-side heat exchanger. The air-side heat exchanger communicates with the cabin heat exchanger and the battery heat exchanger separately. The second working medium is capable of exchanging, in the low-pressure-stage intercooler, heat with the first working medium. The functional heat exchange device includes a motor heat exchange assembly, a heat exchange water tank, a battery heat exchange member, and a cabin heat exchange member. The heat exchange inlet of the motor heat exchange assembly communicates with one of the heat exchange outlet of the heat exchange water tank or the heat exchange outlet of the battery heat exchange member. The heat exchange outlet of the motor heat exchange assembly communicates with one of the heat exchange inlet of the heat exchange water tank or the heat exchange inlet of the cabin heat exchange member. The heat exchange inlet of the battery heat exchange member communicates with a heat exchange outlet of the battery heat exchanger. The heat exchange outlet of the battery heat exchange member communicates with one of the heat exchange inlet of the battery heat exchanger or the heat exchange inlet of the motor heat exchange assembly. The heat exchange inlet of the cabin heat exchange member communicates with one of the heat exchange outlet of the motor heat exchange assembly or the heat exchange outlet of the cabin heat exchanger. The heat exchange outlet of the cabin heat exchange member communicates with one of the heat exchange inlet of the cabin heat exchanger or the heat exchange inlet of the battery heat exchanger.

In some embodiments, the cascade heat pump system for an electric vehicle also includes a motor expansion water tank and a motor water pump connected in series. The inlet of the motor water pump communicates with the motor expansion water tank and the motor heat exchange assembly. The outlet of the motor water pump communicates with one of the heat exchange water tank, the water-side heat exchanger, or the cabin heat exchange member.

In some embodiments, the cascade heat pump system for an electric vehicle also includes a first three-way valve and a second three-way valve. The first valve port of the first three-way valve communicates with the outlet of the motor water pump. The second valve port of the first three-way valve communicates with the heat exchange inlet of the heat exchange water tank. The third valve port of the first three-way valve communicates with the first valve port of the second three-way valve. The first valve port of the first three-way valve switchably communicates with one of the second valve port of the first three-way valve or the third valve port of the first three-way valve. The second valve port of the second three-way valve communicates with the heat exchange inlet of the cabin heat exchange member. The third valve port of the second three-way valve communicates with the heat exchange inlet of the water-side heat exchanger. The first valve port of the second three-way valve switchably communicates with one of the second valve port of the second three-way valve or the third valve port of the second three-way valve.

In some embodiments, the cascade heat pump system for an electric vehicle also includes a battery expansion water tank and a battery water pump. The inlet of the battery water pump communicates with the battery expansion water tank and the battery heat exchanger. The outlet of the battery water pump communicates with the battery heat exchange member.

In some embodiments, the cascade heat pump system for an electric vehicle also includes a third three-way valve and a four-way control valve. The first valve port of the third three-way valve communicates with the heat exchange outlet of the heat exchange water tank. The second valve port of the third three-way valve communicates with the evaporation inlet of the low-pressure-stage evaporator. The third valve port of the third three-way valve communicates with the first valve port of the four-way control valve. The first valve port of the third three-way valve switchably communicates with one of the second valve port of the third three-way valve or the third valve port of the third three-way valve. The first valve port of the four-way control valve communicates with the heat exchange outlet of the cabin heat exchange member through a cabin control valve. The second valve port of the four-way control valve communicates with the heat exchange inlet of the battery heat exchanger. The third valve port of the four-way control valve communicates with the heat exchange outlet of the battery heat exchange member. The fourth valve port of the four-way control valve communicates with the heat exchange inlet of the motor heat exchange assembly. The first valve port of the four-way control valve switchably communicates with one of the second valve port of the four-way control valve or the fourth valve port of the four-way control valve. The third valve port of the four-way control valve switchably communicates with one of the second valve port of the four-way control valve or the fourth valve port of the four-way control valve.

In some embodiments, the cascade heat pump system for an electric vehicle also includes a cabin expansion water tank and a cabin water pump. The inlet of the cabin water pump communicates with the cabin expansion water tank and the cabin heat exchange member. The outlet of the cabin water pump communicates with the cabin heat exchanger.

In some embodiments, the cascade heat pump system for an electric vehicle also includes a fourth three-way valve and a fifth three-way valve. The first valve port of the fourth three-way valve communicates with the high-pressure-stage four-way valve. The second valve port of the fourth three-way valve communicates with the heat exchange outlet of the low-pressure-stage intercooler. The third valve port of the fourth three-way valve communicates with the air-side heat exchanger and the water-side heat exchanger. The first valve port of the fourth three-way valve switchably communicates with one of the second valve port of the fourth three-way valve or the third valve port of the fourth three-way valve. The first valve port of the fifth three-way valve communicates with the cabin heat exchanger and the battery heat exchanger. The second valve port of the fifth three-way valve communicates with the air-side heat exchanger. The third valve port of the fifth three-way valve communicates with the water-side heat exchanger. The first valve port of the fifth three-way valve switchably communicates with one of the second valve port of the fifth three-way valve or the third valve port of the fifth three-way valve.

In some embodiments, the cascade heat pump system for an electric vehicle also includes an economizer. The first port of the economizer communicates with one of the air-side heat exchanger or the water-side heat exchanger. The second port of the economizer communicates with the cabin heat exchanger and the battery heat exchanger. The third port of the economizer communicates with the high-pressure-stage compressor through a one-way valve. The fourth port of the economizer communicates with one of the air-side heat exchanger or the water-side heat exchanger through a two-way control valve.

In some embodiments, the cascade heat pump system for an electric vehicle also includes a cabin heater disposed on the cabin heat exchange member.

In some embodiments, the cascade heat pump system for an electric vehicle also includes a battery heater connected between the battery heat exchanger and the battery heat exchange member.

Figure 1:
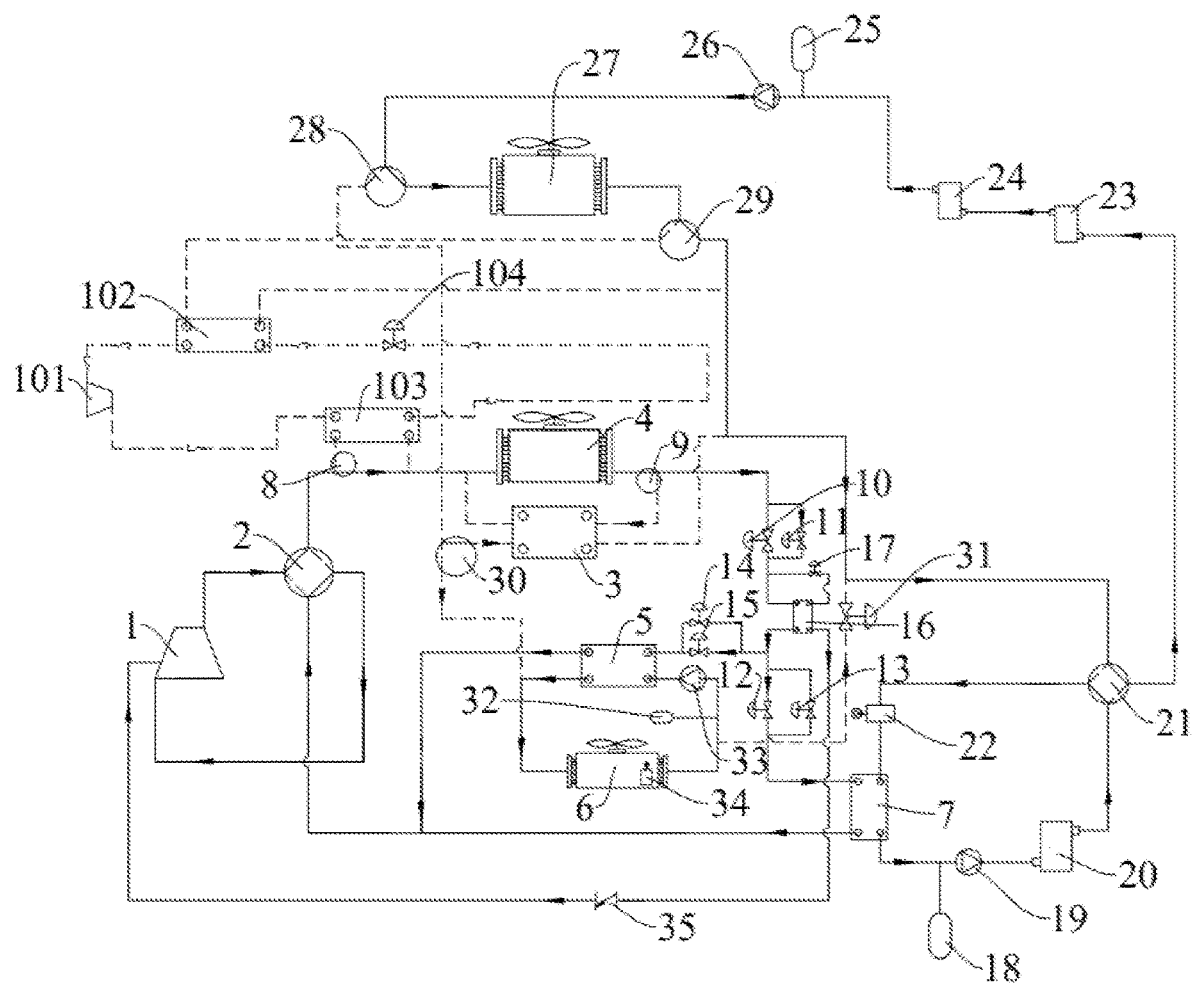
FIG. 1 is a structure diagram illustrating that a cascade heat pump system for an electric vehicle is in a refrigeration working condition according to an embodiment of the present disclosure.

REFERENCE LIST 1 high-pressure-stage compressor
2 high-pressure four-way valve
3 water-side heat exchanger
4 air-side heat exchanger
5 cabin heat exchanger
6 cabin heat exchange member
7 battery heat exchanger
8 fourth three-way valve
9 fifth three-way valve
10 heating electronic expansion valve
11 refrigeration two-way valve
12 battery refrigeration electronic expansion valve
13 battery heating two-way valve
14 cabin heating two-way valve
15 cabin refrigeration electronic expansion valve
16 economizer
17 two-way control valve
18 battery expansion water tank
19 battery water pump
20 battery heat exchange member
21 four-way control valve
22 battery heater
23 electronic control heat exchange member
24 motor heat exchange member
25 motor expansion water tank
26 motor water pump
27 heat exchange water tank
28 first three-way valve
29 third three-way valve
30 second three-way valve
31 cabin control valve
32 cabin expansion water pump
33 cabin water pump
34 cabin heater
35 one-way valve
101 low-pressure-stage compressor
102 low-pressure-stage evaporator 103 low-pressure-stage intercooler
104 low-pressure expansion valve

DETAILED DESCRIPTION

To make solved problems, adopted solutions, and achieved effects of the present disclosure more apparent, the solutions of the present disclosure are described hereinafter in conjunction with the drawings and embodiments.

In the description of the present disclosure, orientations or position relations indicated by terms such as "center", "longitudinal", "lateral", "length", "width", "thickness", "above", "below", "front", "back", "left", "right", "vertical", "horizontal", "top", "bottom", "inside", "outside", "clockwise", "counterclockwise", "axial", "radial", and "circumferential" are based on orientations or position relations shown in the drawings. These orientations or position relations are intended only to facilitate the description of the present disclosure and simplify the description and not to indicate or imply that an apparatus or element referred to must have such orientations or must be configured or operated in such orientations. Thus, these orientations or position relations are not to be construed as limiting the present disclosure.

In addition, a feature defined as a "first" feature or a "second" feature may explicitly or implicitly include one or more of such features to distinguish and describe features regardless of order or weight. In the description of the present disclosure, unless otherwise noted, the phrase of "a plurality of" means two or more.

In the description of the present disclosure, it is to be noted that unless otherwise specified and limited, terms "mounted", "joined" and "connected" are to be understood in a broad sense unless otherwise expressly specified and limited. For example, the term "connected" may refer to "securely connected", "detachably connected" or "integrated", may refer to "mechanically connected" or "electrically connected", or may refer to "connected directly", "connected indirectly through an intermediary" or "connected inside two components". For those of ordinary skill in the art, meanings of the preceding terms in the present disclosure may be construed based on situations.

The structure of a cascade heat pump system for an electric vehicle in embodiments of the present disclosure is described with reference to FIGS. 1 to 6.

The present disclosure discloses a cascade heat pump system for an electric vehicle. As shown in FIGS. 1 to 6, the cascade heat pump system for an electric vehicle in this embodiment includes a low-pressure-stage compression device, a high-pressure-stage compression device, and a functional heat exchange device. The low-pressure-stage compression device includes a low-pressure-stage compressor 101, a low-pressure-stage evaporator 102, a low-pressure expansion valve 104, and a low-pressure-stage intercooler 103 connected in sequence and has a first working medium circulating in. The high-pressure-stage compression includes a high-pressure-stage compressor 1, a high-pressure-stage four-way valve 2, an air-side heat exchanger 4, a water-side heat exchanger 3, a cabin heat exchanger 5, and a battery heat exchanger 7. The compressor outlet of the high-pressure-stage compressor 1 communicates with one of the air-side heat exchanger 4 or the water-side heat exchanger 3. The air-side heat exchanger 4 communicates with the cabin heat exchanger 5 and the battery heat exchanger 7 separately. The high-pressure-stage compression has a second working medium circulating in. The second working medium is capable of exchanging, in the low-pressure-stage intercooler 103, heat with the first working medium. The functional heat exchange device includes a motor heat exchange assembly, a heat exchange water tank 27, a battery heat exchange member 20, and a cabin heat exchange member 6. In this embodiment, the motor heat exchange assembly includes a motor heat exchange member 24 and an electronic control heat exchange member 23 connected in series. The motor heat exchange member 24 can cool the motor of the electric vehicle. The electronic control heat exchange member 23 can exchange heat for an electronic control circuit board for controlling the motor of the electric vehicle.

The heat exchange inlet of the motor heat exchange assembly communicates with one of the heat exchange outlet of the heat exchange water tank 27 or the heat exchange outlet of the battery heat exchange member 20. The heat exchange outlet of the motor heat exchange assembly communicates with one of the heat exchange inlet of the heat exchange water tank 27 or the heat exchange inlet of the cabin heat exchange member 6. The heat exchange inlet of the battery heat exchange member 20 communicates with the heat exchange outlet of the battery heat exchanger 7. The heat exchange outlet of the battery heat exchange member 20 communicates with one of the heat exchange inlet of the battery heat exchanger 7 or the heat exchange inlet of the motor heat exchange assembly. The heat exchange inlet of the cabin heat exchange member 6 communicates with one of the heat exchange outlet of the motor heat exchange assembly or the heat exchange outlet of the cabin heat exchanger 5. The heat exchange outlet of the cabin heat exchange member 6 communicates with one of the heat exchange inlet of the cabin heat exchanger 5 or the heat exchange inlet of the battery heat exchanger 7.

Firstly, it is to be noted that a compressor module of a thermal management system of an existing electric vehicle is usually a single-stage compressor device, causing the difference between an evaporation temperature and a condensation temperature of the compressor device to be excessively large in the case where the ambient temperature is particularly low, resulting in the unsteady heating. Moreover, the heat source of the thermal management system of the existing electric vehicle is an air heat source in the process of heating in winter, and the waste heat of the motor or the battery cannot be utilized, causing the utilization efficiency of the waste heat of the electric vehicle to be low, thereby shortening the driving course of the electric vehicle.

However, the cascade heat pump system for an electric vehicle disclosed in this embodiment has the six working conditions below according to the switchable connection state of each component.

Refrigeration Working Condition:

As shown in FIG. 1, when the external ambient temperature is relatively high and the electric vehicle is in a driving state, the cabin, the battery, the motor, and the electronic control circuit board all need to be cooled. In this condition, the high-pressure-stage compression device is turned on, the low-pressure-stage compression device is turned off, and the second working medium flows from the outlet of the high-pressure-stage compressor 1, flows through the air-side heat exchanger 4 in sequence, and then is divided into two streams. One stream of the second working medium flows to the cabin heat exchanger 5, the other stream of the second working medium flows to the battery heat exchanger 7, and finally the two streams return to the high-pressure-stage compressor 1 through the high-pressure-stage four-way valve 2. Thus, the cabin heat exchanger 5 and the cabin heat exchange member 6 form a cabin refrigeration circuit. In the cabin heat exchanger 5, the second working medium can exchange heat with a coolant flowing out of the cabin heat exchange member 6 so as to cool the coolant and thus cool the cabin. The battery heat exchanger 7 and the battery heat exchange member 20 form a cabin refrigeration circuit. In the battery heat exchanger 7, the second working medium can exchange heat with the coolant flowing out of the battery heat exchange member 20 so as to cool the coolant and thus cool the battery. The motor and the electronic control circuit board can be cooled after the coolant in the heat exchange water tank 27 flows to the electronic control heat exchange member 23 and the motor heat exchange member 24. In this working condition, the cascade heat pump system uses the ambient air as the heat source to cool the battery, the motor, the electrically controlled circuit board, and the cabin.

Figure 2:
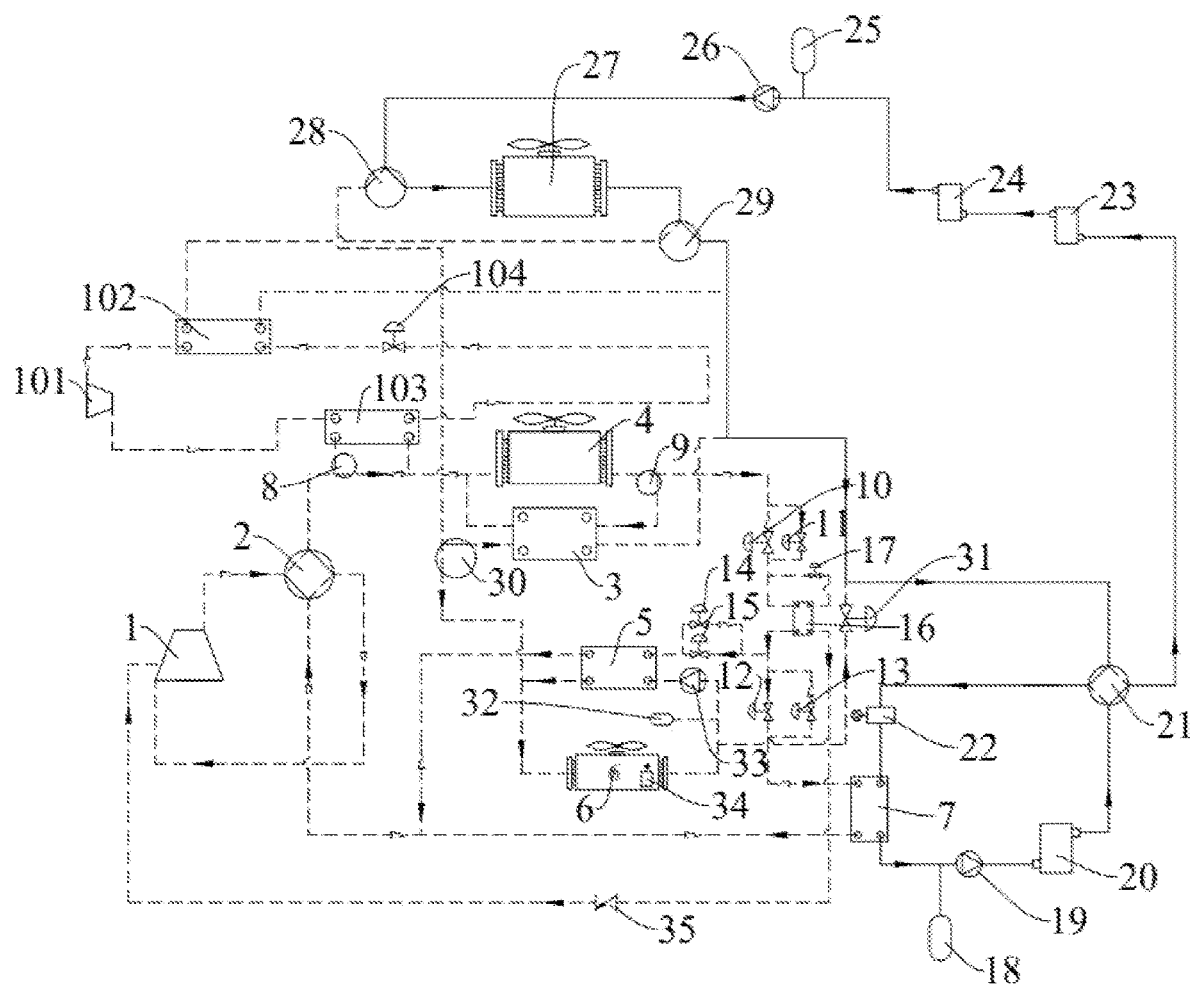
FIG. 2 is a structure diagram illustrating that a cascade heat pump system for an electric vehicle is in a natural cooling working condition according to an embodiment of the present disclosure.

Natural Cooling Working Condition:

As shown in FIG. 2, when the external ambient temperature is moderate, the cabin does not need to be cooled while the motor, the battery, and the electronic control circuit board all need to be cooled. In this case, the electric vehicle is generally in a parking state or a normal driving state. In this condition, the high-pressure-stage compression device and the low-pressure-stage compression device are both turned off. The coolant in the heat exchange water tank 27 flows through the battery heat exchanger 7, the battery heat exchange member 20, the electronic control heat exchange member 23, and the motor heat exchange member 24 in sequence and returns to the heat exchange water tank 27. In this condition, the cascade heat pump system uses the ambient air as the heat source to cool the battery, the motor, and the electronic control circuit board.

Figure 3:
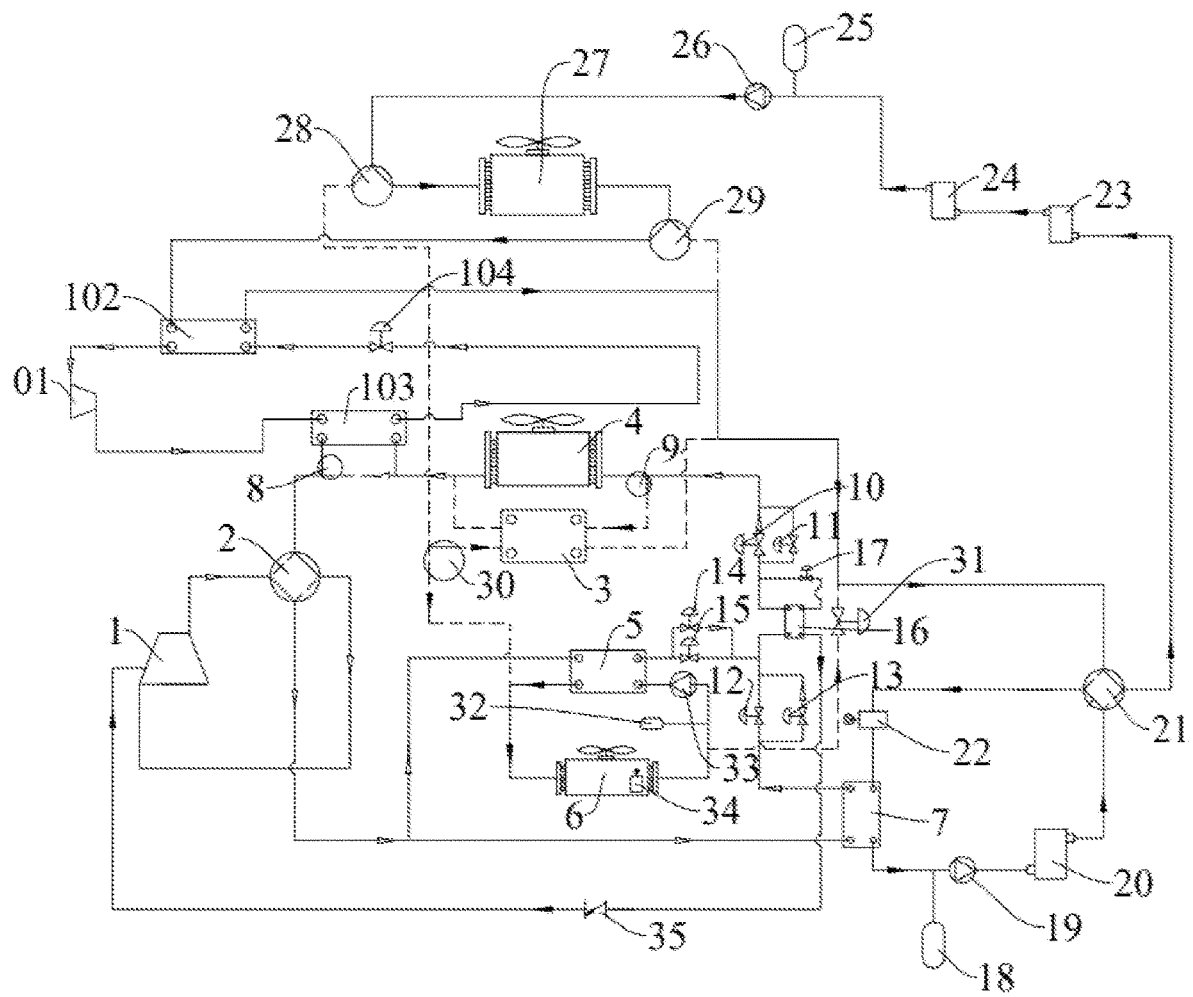
FIG. 3 is a structure diagram illustrating that a cascade heat pump system for an electric vehicle is in an air source heat pump two-stage compression working condition according to an embodiment of the present disclosure.

Air Source Heat Pump Two-Stage Compression Working Condition:

As shown in FIG. 3, when the external ambient temperature is extremely low, the cabin and the battery both need to be heated. In this case, the electric vehicle is generally in a parking state or just started for a short time. In this condition, the high-pressure-stage compression device and the low-pressure-stage compression device are both on. The coolant in the heat exchange water tank 27 flows through the low-pressure-stage evaporator 102, the electrically-controlled heat exchange member 23, and the motor heat exchange member 24 and returns to the heat exchange water tank 27 so as to form a motor cooling circuit. The first working medium flows out of the low-pressure-stage compressor 101 and then passes through the low-pressure-stage intercooler 103, the low-pressure expansion valve 104, and the low-pressure-stage evaporator 102 in sequence and finally returns to the low-pressure-stage compressor 101. The first working medium can exchange heat with the coolant flowing out of the heat exchange water tank 27 in the low-pressure-stage evaporator 102 so that the temperature of the first working medium increases and the temperature of the coolant decreases. The second working medium flows out of the high-pressure-stage compressor 1 and is divided into two streams. One stream of the second working medium flows to the cabin heat exchanger 5 and the other stream of the second working medium flows to the battery heat exchanger 7. The two streams of the second working medium flow through the cabin heat exchanger 5 and the battery heat exchanger 7, respectively, then converge and flow to the air-side heat exchanger 4, then pass through the low-pressure-stage intercooler 103, and return to the high-pressure-stage compressor 1. Thus, the cabin heat exchanger 5 and the cabin heat exchange member 6 form a cabin heating circuit. In the cabin heat exchanger 5, the second working medium can exchange heat with the coolant flowing out of the cabin heat exchange member 6 so as to warm up the coolant and thus heat the cabin. The battery heat exchanger 7 and the battery heat exchange member 20 form a cabin heating circuit. In the battery heat exchanger 7, the second working medium can exchange heat with the coolant flowing out of the battery heat exchange member 20 so as to warm up the coolant and thus heat the battery. The second working medium can exchange, in the low-pressure-stage intercooler 103, heat with the first working medium so as to warm up the second working medium and cool down the first working medium. That is, in this state, the low-pressure-stage evaporator 102 uses the heat exchange water tank 27 as the heat source to evaporate the first working medium. A high-pressure-stage evaporator uses the first working medium and the ambient air as the heat source to evaporate the first working medium. In the related art, when the ambient temperature is excessively low, it is difficult for the working medium of the compressor module to obtain the heat from the air, reducing the heating efficiency of the cabin and the battery. However, in this embodiment, the low-pressure-stage compression device and the high-pressure-stage compression device are provided. In this manner, even if the ambient temperature is extremely low, the first working medium can obtain the heat from the coolant of the heat exchanger tank 27, and the second working medium can obtain the heat from the first working medium in the low-pressure-stage intercooler 103, thereby ensuring the heating efficiency of the cabin and the battery.

Figure 4:
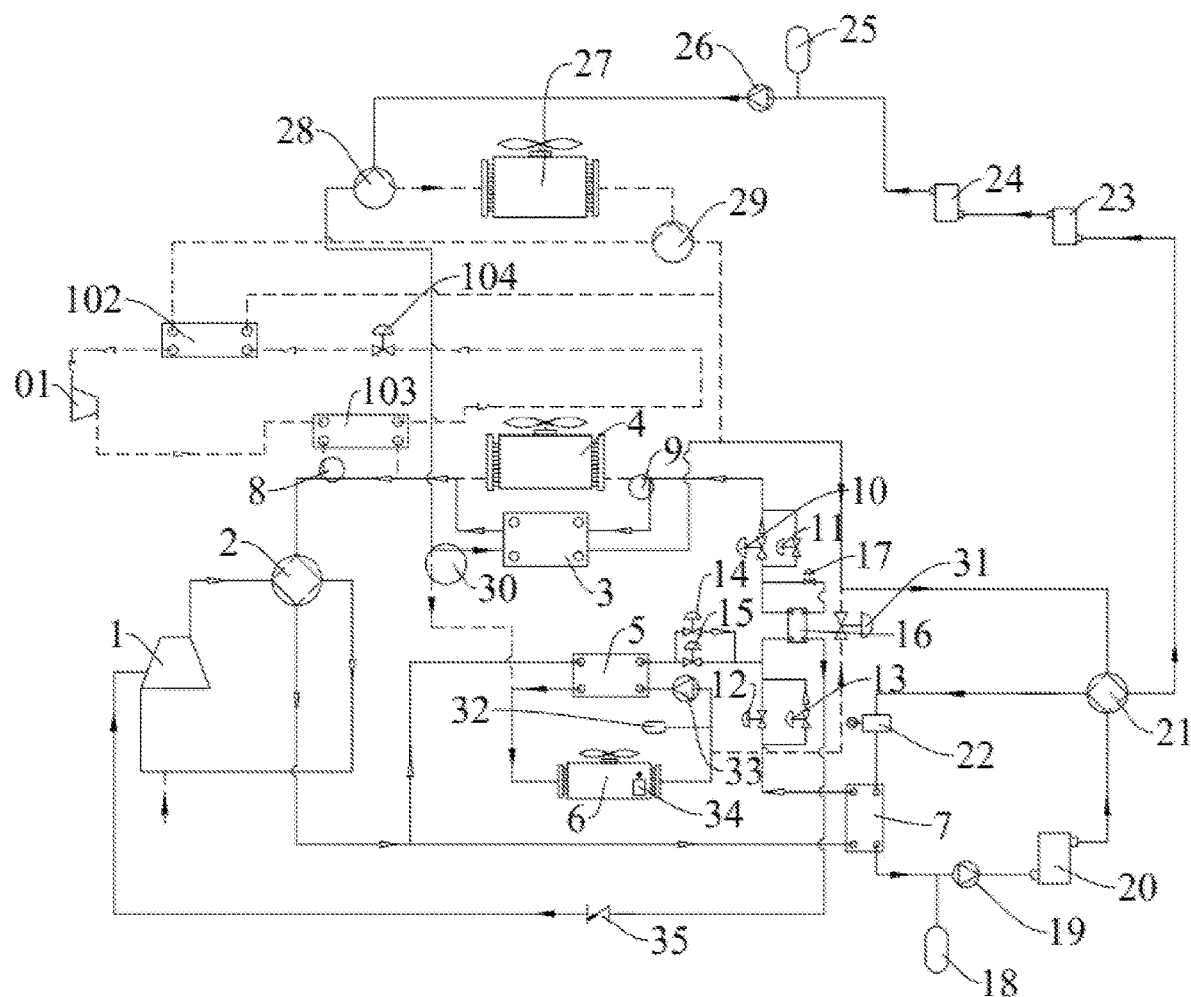
FIG. 4 is a structure diagram illustrating that a cascade heat pump system for an electric vehicle is in a motor electronic control source heat pump working condition according to an embodiment of the present disclosure.

Motor Electronic Control Source Heat Pump Working Condition:

As shown in FIG. 4, when the external ambient temperature is extremely low, the cabin and the battery need to be heated while the motor and the electronic control circuit board can generate more heat since the electric vehicle has been driving for some time. In this condition, the high-pressure-stage compression device is turned on. The low-pressure-stage compression device is turned off. The electrically-controlled heat exchange member 23, the motor heat exchange member 24, and the water-side heat exchanger 3 form a motor electronic control cooling circuit. The second working medium flows out of the high-pressure-stage compressor 1 and is divided into two streams. One stream of the second working medium flows to the cabin heat exchanger 5, and the other stream of the second working medium flows to the battery heat exchanger 7. The two streams of the second working medium flow through the cabin heat exchanger 5 and the battery heat exchanger 7, respectively, then converge and flow to the water-side heat exchanger 3, then pass through the water-side heat exchanger 3 and return to the high-pressure-stage compressor 1. Thus, the cabin heat exchanger 5 and the cabin heat exchange member 6 form the cabin heating circuit. In the cabin heat exchanger 5, the second working medium can exchange heat with the coolant flowing out of the cabin heat exchange member 6 so as to warm up the coolant and thus heat the cabin. The battery heat exchanger 7 and the battery heat exchange member 20 form the cabin heating circuit. In the battery heat exchanger 7, the second working medium can exchange heat with the coolant flowing out of the battery heat exchange member 20 so as to warm up the coolant and thus heat the battery. In this state, the high-pressure-stage evaporator evaporates in a way that the first working medium can absorb, in the water-side heat exchanger 3, the heat of the coolant for cooling the motor and the electronic control circuit board. That is, in this working condition, the high-pressure-stage compression device uses the heat of the coolant of the motor and the electronic control circuit board as the heat source to complete the circulation of the second working medium. With respect to the air heat source, the coolant of the motor and the electronic control circuit board is used as the heat source, improving the quality of the heat source, and improving the heating efficiency of the high-pressure-stage compression device, thereby achieving the effect of energy saving.

Figure 5:
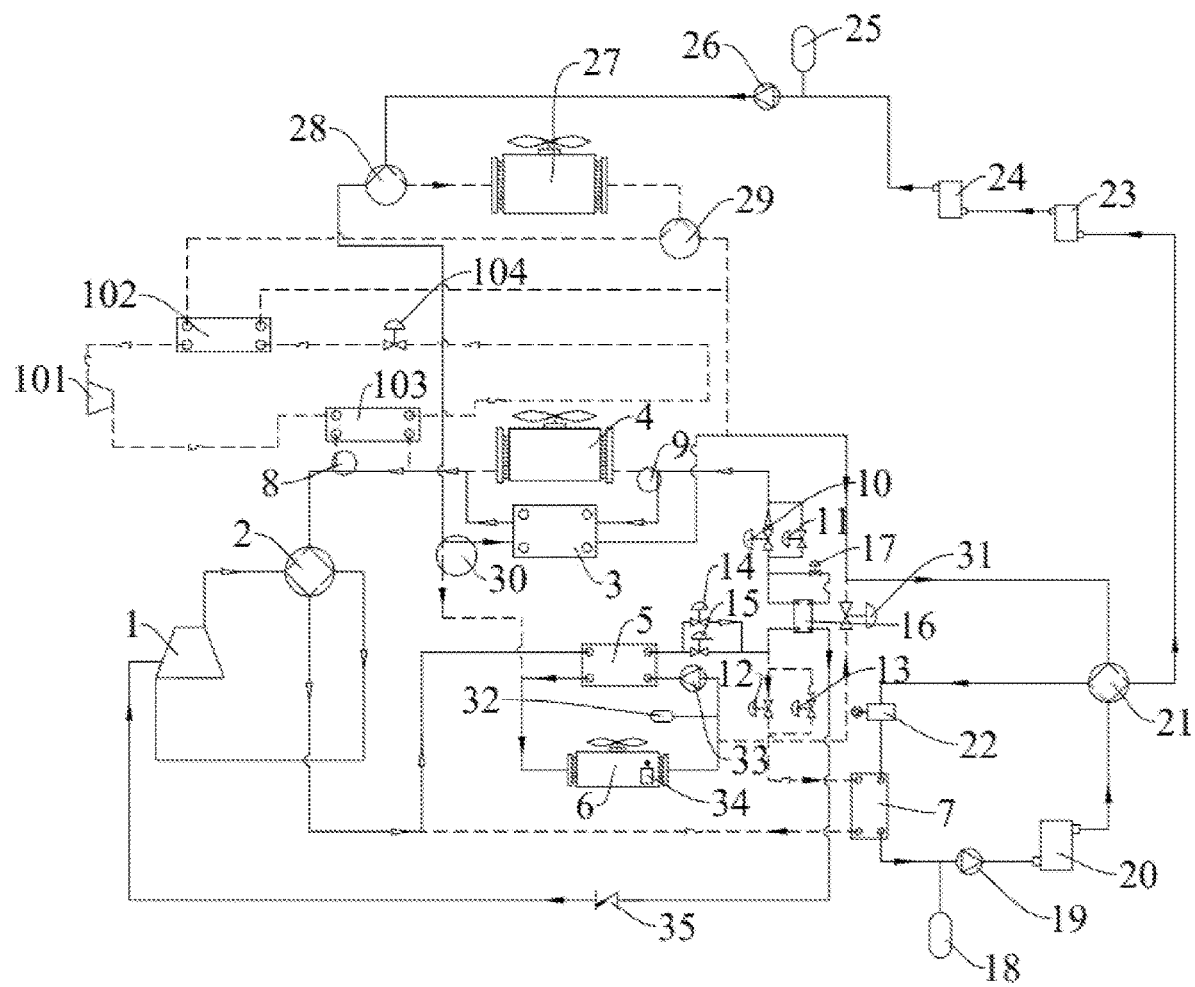
FIG. 5 is a structure diagram illustrating that a cascade heat pump system for an electric vehicle is in a battery source heat pump working condition according to an embodiment of the present disclosure.

Battery Source Heat Pump Working Condition:

As shown in FIG. 5, when the external ambient temperature is extremely low, the electric vehicle is generally in a parking state. In this case, the cabin needs to be heated. The motor and the electronic control circuit board are both in a stop-working state so that the motor and the electronic control circuit board have a relatively low temperature and cannot be used as the heat source. However, in this case, the battery is still working and can generate more heat. In this condition, the high-pressure-stage compression device is turned on. The low-pressure-stage compression device is turned off. The electronic control heat exchange member 23, the motor heat exchange member 24, the water-side heat exchanger 3, the battery heat exchanger 7, and the battery heat exchange member 20 form a battery cooling circuit. The second working medium flows out of the high-pressure-stage compressor 1 and is divided into two streams. One stream of the second working medium flows to the cabin heat exchanger 5, and the other stream of the second working medium flows to the battery heat exchanger 7. The two streams of the second working medium flow through the cabin heat exchanger 5 and the battery heat exchanger 7, respectively, then converge and flow to the water-side heat exchanger 3, then pass through the water-side heat exchanger 3 and return to the high-pressure-stage compressor 1. Thus, the cabin heat exchanger 5 and the cabin heat exchange member 6 form the cabin heating circuit. In the cabin heat exchanger 5, the second working medium can exchange heat with the coolant flowing out of the cabin heat exchange member 6 so as to warm up the coolant and thus heat the cabin. In this state, the high-pressure-stage evaporator evaporates in a way that the first working medium can absorb the heat of the coolant for cooling the battery in the water-side heat exchanger 3. That is, in this working condition, the high-pressure-stage compression device uses the heat of the coolant of the battery as the heat source to complete the circulation of the second working medium. With respect to the air heat source, the coolant of the battery is used as the heat source, improving the quality of the heat source, and improving the heating efficiency of the high-pressure-stage compression device, thereby achieving the effect of energy saving.

Figure 6:
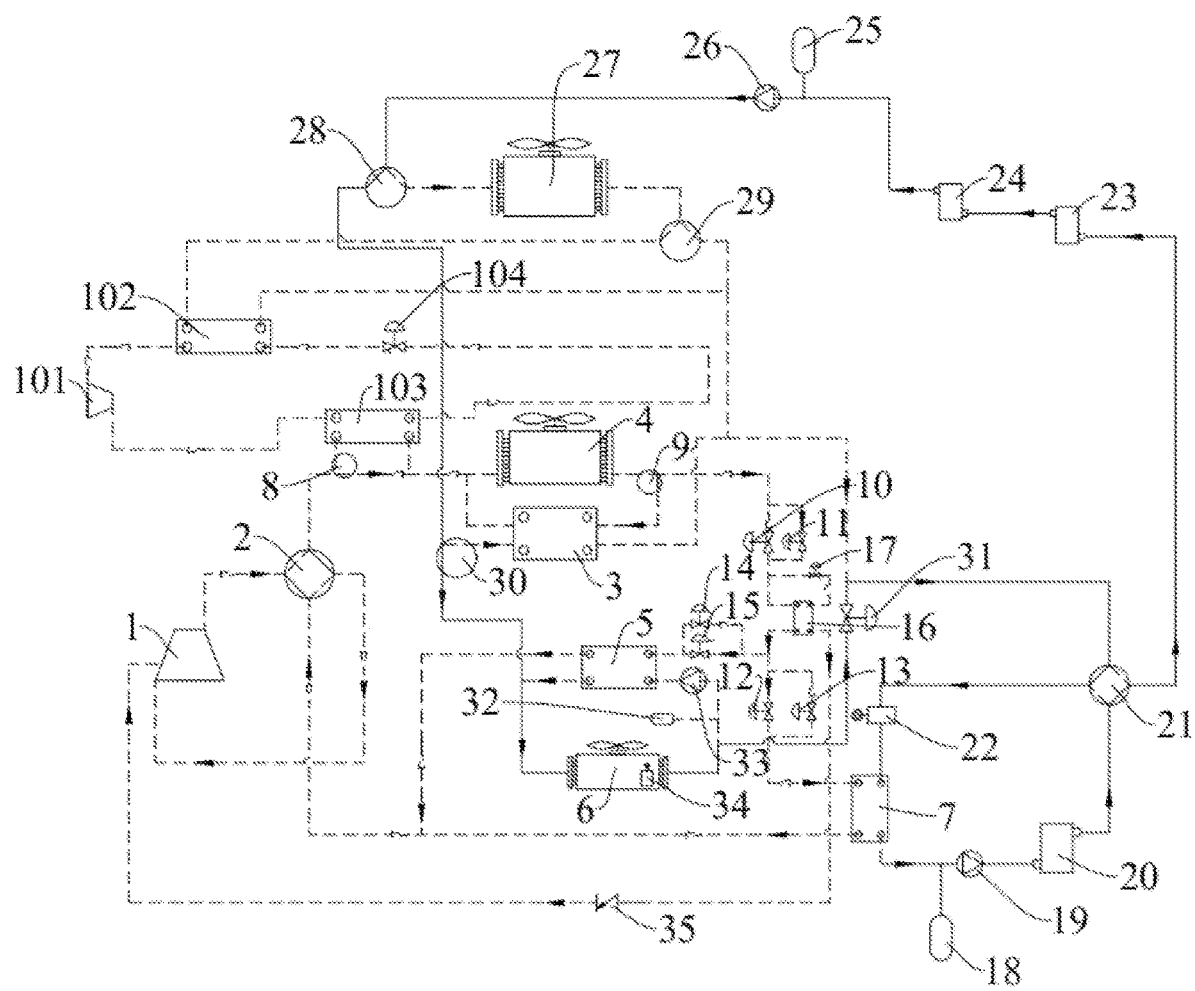
FIG. 6 is a structure diagram illustrating that a cascade heat pump system for an electric vehicle is in a natural heating working condition according to an embodiment of the present disclosure.

Natural Heating Working Condition:

As shown in FIG. 6, when the ambient temperature is relatively low, the cabin needs to be heated while the motor, the electronic control circuit board, and the battery are all in a normal working state and can be used as the heat source. In this condition, the high-pressure-stage compression device and the low-pressure-stage compression device are both turned off. The electrically controlled heat exchange member 23, the motor heat exchange member 24, the cabin heat exchange member 6, the battery heat exchanger 7, and the battery heat exchange member 20 form the motor electrically controlled battery cooling circuit. In this state, the heat generated by the battery, the electrically controlled circuit board, and the battery is directly used as the heat source for heating the cabin, improving the energy-saving effect while stably heating the cabin.

In summary, in the cascade heat pump system for an electric vehicle in this embodiment, the low-pressure-stage compression device and the high-pressure-stage compression device are provided. The high-pressure-stage compression device includes the air-side heat exchanger capable of exchanging heat with air and the water-side heat exchanger capable of exchanging heat with a coolant, and the second working medium can exchange, in the low-pressure-stage intercooler, heat with the first working medium. In this manner, at an extremely low temperature, the second working medium uses the first working medium, the air, and the coolant as the heat source, improving the quality of the heat source, and ensuring the heating efficiency. Moreover, the cascade heat pump system for an electric vehicle in this embodiment may also use the waste heat of the battery, the motor, or the electronic control circuit board as the heat source to heat the cabin according to the working state and the ambient temperature of the electric vehicle, improving the utilization rate of the waste heat of the electric vehicle, and facilitating improving the mileage of the electric vehicle.

In an embodiment, in this embodiment, the first working medium is carbon dioxide. The second working medium is an R1234yf refrigerant. Of course, in other embodiments of the present disclosure, the first working medium and the second working medium may also be other refrigerants depending on actual needs.

As shown in FIG. 1, the cascade heat pump system for an electric vehicle in this embodiment also includes a motor expansion water tank 25 and a motor water pump 26 connected in series. The inlet of the motor water pump 26 communicates with the motor expansion water tank 25 and the motor heat exchange assembly. The outlet of the motor water pump 26 communicates with one of the heat exchange water tank 27, the water-side heat exchanger 3, or the cabin heat exchange member 6. It is to be understood that the motor water pump 26 can ensure the coolant to stably circulate in the motor cooling circuit, thereby ensuring the heat exchange of the coolant to be stably performed. Moreover, the motor expansion water tank 25 can buffer the coolant, avoiding the phenomenon that excessive or insufficient coolant in the entire circuit affects the heat exchange effect.

Further, as shown in FIG. 1, the cascade heat pump system for an electric vehicle includes a first three-way valve 28 and a second three-way valve 30. The first valve port of the first three-way valve 28 communicates with the outlet of the motor water pump 26. The second valve port of the first three-way valve 28 communicates with the heat exchange inlet of the heat exchange water tank 27. The third valve port of the first three-way valve 28 communicates with the first valve port of the second three-way valve 30. The first valve port of the first three-way valve 28 switchably communicates with one of the second valve port of the first three-way valve 28 or the third valve port of the first three-way valve 28. The second valve port of the second three-way valve 30 communicates with the heat exchange inlet of the cabin heat exchange member 6. The third valve port of the second three-way valve 30 communicates with the heat exchange inlet of the water-side heat exchanger 3. The first valve port of the second three-way valve 30 switchably communicates with one of the second valve port of the second three-way valve 30 or the third valve port of the second three-way valve 30.

It is to be understood that in the refrigeration working condition, the natural cooling working condition, and the air source heat pump two-stage compression working condition, the first valve port of the first three-way valve 28 communicates with the second valve port of the first three-way valve 28. Thus, the coolant can be driven by the motor water pump 26 to enter the heat exchange water tank 27. In the motor electronic control source heat pump working condition and the battery source heat pump working condition, the first valve port of the first three-way valve 28 communicates with the third valve port of the first three-way valve 28. The first valve port of the second three-way valve 30 communicates with the third valve port of the second three-way valve 30. Thus, the coolant can be driven by the motor water pump 26 to enter the water-side heat exchanger 3. In the natural heating condition, the first valve port of the first three-way valve 28 communicates with the second valve port of the first three-way valve 28. The first valve port of the second three-way valve 30 communicates with the second valve port of the second three-way valve 30. Thus, the coolant can be driven by the motor water pump 26 to enter the cabin heat exchanger 5. Thus, various working conditions can be switched by using the first three-way valve 28 and the second three-way valve 30, simplifying the overall structure of the heat pump system for an electric vehicle, and reducing the manufacturing cost. Of course, in other embodiments of the present disclosure, a plurality of two-way valves may also be used for replacing the first three-way valve 28 and the second three-way valve 30.

As shown in FIG. 1, the cascade heat pump system for an electric vehicle also includes a battery expansion water tank 18 and a battery water pump 19. The inlet of the battery water pump 19 communicates with the battery expansion water tank 18 and the battery heat exchanger 7. The outlet of the battery water pump 19 communicates with the battery heat exchange member 20. It is to be understood that the battery water pump 19 can ensure the coolant to stably circulate in the battery cooling circuit, thereby ensuring the heat exchange of the coolant to be stably performed. Moreover, the battery expansion water tank 18 can buffer the coolant, avoiding the phenomenon that excessive or insufficient coolant in the entire circuit affects the heat exchange effect.

Further, as shown in FIG. 1, the cascade heat pump system for an electric vehicle also includes a third three-way valve 29 and a four-way control valve 21. The first valve port of the third three-way valve 29 communicates with the heat exchange outlet of the heat exchange water tank 27. The second valve port of the third three-way valve 29 communicates with the evaporation inlet of the low-pressure-stage evaporator 102. The third valve port of the third three-way valve 29 communicates with the first valve port of the four-way control valve 21. The first valve port of the third three-way valve 29 switchably communicates with one of the second valve port of the third three-way valve 29 or the third valve port of the third three-way valve 29. The first valve port of the four-way control valve 21 communicates with the heat exchange outlet of the cabin heat exchange member 6 through a cabin control valve 31. The second valve port of the four-way control valve 21 communicates with the heat exchange inlet of the battery heat exchanger 7. The third valve port of the four-way control valve 21 communicates with the heat exchange outlet of the battery heat exchange member 20. The fourth valve port of the four-way control valve 21 communicates with the heat exchange inlet of the motor heat exchange assembly. The first valve port of the four-way control valve 21 switchably communicates with one of the second valve port of the four-way control valve 21 or the fourth valve port of the four-way control valve 21. The third valve port of the four-way control valve 21 switchably communicates with one of the second valve port of the four-way control valve 21 or the fourth valve port of the four-way control valve 21.

It is to be understood that, in the refrigeration working condition, the first valve port of the third three-way valve 29 communicates with the third valve port. The first valve port of the four-way control valve 21 communicates with the fourth valve port. The third valve port communicates with the second valve port. Thus, the coolant can be driven by the battery pump to enter the battery heat exchanger 7. In the natural cooling working condition, the first valve port of the third three-way valve 29 communicates with the third valve port of the third three-way valve 29. The first valve port of the four-way control valve 21 communicates with the second valve port of the four-way control valve 21. The third valve port of the four-way control valve 21 communicates with the fourth port of the four-way control valve 21. Thus, the coolant can be driven by the battery water pump 19 to enter the electronic control heat exchange member 23. In the air source heat pump two-stage compression working condition, the first valve port of the third three-way valve 29 communicates with the second valve port of the third three-way valve 29. The first valve port of the four-way control valve 21 communicates with the fourth valve port of the four-way control valve 21. The third valve port of the four-way control valve 21 communicates with the second valve port of the four-way control valve 21. Thus, the coolant can be driven by the battery pump to enter the battery heat exchanger 7. In the motor electronic control source heat pump working condition, the coolant does not pass through the third three-way valve 29. The first valve port of the four-way control valve 21 communicates with the fourth valve port of the four-way control valve 21. The third valve port of the four-way control valve 21 communicates with the second valve port of the four-way control valve 21. Thus, the coolant can be driven by the battery pump to enter the battery heat exchanger 7. In the battery source heat pump working condition and the natural cooling working condition, the coolant does not pass through the third three-way valve 29. The first valve port of the four-way control valve 21 communicates with the second valve port of the four-way control valve 21. The third valve port of the four-way control valve 21 communicates with the fourth valve port of the four-way control valve 21. Thus, the coolant can be driven by the battery pump to enter the electronic control heat exchange member 23. Thus, various working conditions can be switched by using the third three-way valve 29 and the four-way control valve 21, simplifying the overall structure of the heat pump system for an electric vehicle, and reducing the manufacturing cost. Of course, in other embodiments of the present disclosure, a plurality of two-way valves may also be used for replacing the third three-way valve 29 and the four-way control valve 21.

As shown in FIG. 1, the cascade heat pump system for an electric vehicle in this embodiment also includes a cabin expansion water tank 32 and a cabin water pump 33. The inlet of the cabin water pump 33 communicates with the cabin expansion water tank 32 and the cabin heat exchange member 6. The outlet of the cabin water pump 33 communicates with the cabin heat exchanger 5. It is to be understood that the cabin water pump 33 can ensure the coolant to stably circulate in the cabin cooling circuit, thereby ensuring the heat exchange of the coolant to be stably performed. Moreover, the cabin expansion water tank 32 can buffer the coolant, avoiding the phenomenon that excessive or insufficient coolant in the entire circuit affects the heat exchange effect.

Further, as shown in FIG. 1, the cascade heat pump system for an electric vehicle in this embodiment also includes a fourth three-way valve 8 and a fifth three-way valve 9. The first valve port of the fourth three-way valve 8 communicates with the high-pressure-stage four-way valve 2. The second valve port of the fourth three-way valve 8 communicates with the heat exchange outlet of the low-pressure-stage intercooler 103. The third valve port of the fourth three-way valve 8 communicates with the air-side heat exchanger 4 and the water-side heat exchanger 3. The first valve port of the fourth three-way valve 8 switchably communicates with one of the second valve port of the fourth three-way valve 8 or the third valve port of the fourth three-way valve 8. The first valve port of the fifth three-way valve 9 communicates with the cabin heat exchanger 5 and the battery heat exchanger 7. The second valve port of the fifth three-way valve 9 communicates with the air-side heat exchanger 4. The third valve port of the fifth three-way valve 9 communicates with the water-side heat exchanger 3. The first valve port of the fifth three-way valve 9 switchably communicates with one of the second valve port of the fifth three-way valve 9 or the third valve port of the fifth three-way valve 9.

It is to be understood that in the refrigeration working condition, the first valve port of the fourth three-way valve 8 communicates with the third valve port of the fourth three-way valve 8. The first valve port of the fifth three-way valve 9 communicates with the second valve port of the fifth three-way valve 9. In the natural cooling working condition and the natural heating working condition, the coolant passes through neither the fourth three-way valve 8 nor the fifth three-way valve 9. In the air source heat pump two-stage compression working condition, the first valve port of the fourth three-way valve 8 communicates with the second valve port of the fourth three-way valve 8. The first valve port of the fifth three-way valve 9 communicates with the second valve port of the fifth three-way valve 9. Thus, the first cooling medium and the second cooling medium can exchange heat in the low-pressure-stage intercooler 103. In the motor electronic control source heat pump working condition, the first valve port of the fourth three-way valve 8 communicates with the third valve port of the fourth three-way valve 8. The first valve port of the fifth three-way valve 9 communicates with the third valve port of the fifth three-way valve 9. Thus, the second cooling medium and the coolant can exchange heat in the water-side heat exchanger 3. Thus, various working conditions can be switched by using the fourth three-way valve 8 and the fifth three-way valve 9, simplifying the overall structure of the heat pump system for an electric vehicle, and reducing the manufacturing cost. Of course, in other embodiments of the present disclosure, a plurality of two-way valves may also be used for replacing the fourth three-way valve 8 and the fifth three-way valve 9.

Further, as shown in FIG. 1, a heating electronic expansion valve 10 and a refrigeration two-way valve 11 are connected in parallel between the first valve port of the fifth three-way valve 9 and the cabin heat exchanger 5 and the battery heat exchanger 7. It is to be understood that in the air source heat pump two-stage compression working condition, the motor electronic control source heat pump working condition, and the battery source heat pump working condition, the second working medium flowing to the air-side heat exchanger 4 or the water-side heat exchanger 3 needs to have fewer liquid components and more gaseous components, thereby facilitating the heat absorption in the air-side heat exchanger 4 or the water-side heat exchanger 3. However, in the refrigeration working condition, the second working medium flowing out of the air-side heat exchanger 4 or the water-side heat exchanger 3 does not need to be throttled and cooled. In this embodiment, the heating electronic expansion valve 10 and the refrigeration two-way valve 11 are added. In the air source heat pump two-stage compression working condition, the motor electronic control source heat pump working condition, and the battery source heat pump working condition, the second working medium flows from the heating electronic expansion valve 10 to the air-side heat exchanger 4 or the water-side heat exchanger 3. In the refrigeration working condition, the second working medium flows to the cabin heat exchanger 5 and the battery heat exchanger 7 through the refrigeration two-way valve 11. In this manner, the energy efficiency of the high-pressure-stage compression device can be improved, thereby achieving the energy-saving function, and facilitating prolonging the mileage of the electric vehicle.

As shown in FIG. 1, a cabin heating two-way valve 14 and a cabin refrigeration electronic expansion valve 15 are connected in parallel between the cabin heat exchanger 5 and the wind side heat exchanger 4. It is to be understood that in the refrigeration working condition, the second working medium flowing to the cabin heat exchanger 5 needs to have fewer liquid components and more gaseous components, thereby facilitating the heat absorption in the cabin heat exchanger 5, and reducing the temperature of the coolant. However, in the air source heat pump two-stage compression working condition, the motor electronic control source heat pump working condition, and the battery source heat pump working condition, the second working medium flowing out of the cabin heat exchanger 5 does not need to be throttled and cooled. In this embodiment, the cabin heating two-way valve 14 and the cabin refrigeration electronic expansion valve 15 are added. In the air source heat pump two-stage compression working condition, the motor electronic control source heat pump working condition, and the battery source heat pump working condition, the second working medium flows from the cabin heating two-way valve 14 to the wind side heat exchanger 4 or the water-side heat exchanger 3. In the refrigeration working condition, the second working medium flows to the cabin heat exchanger 5 through the cabin refrigeration electronic expansion valve 15. In this manner, the energy efficiency of the high-pressure-stage compression device can be improved, thereby achieving the energy-saving function, and facilitating prolonging the mileage of the electric vehicle.

As shown in FIG. 1, a battery heating two-way valve 13 and a battery refrigeration electronic expansion valve 12 are connected in parallel between the battery heat exchanger 7 and the air-side heat exchanger 4. It is to be understood that, in the refrigeration working condition, the second working medium flowing to the battery heat exchanger 7 needs to have fewer liquid components and more gaseous components, thereby facilitating the heat absorption in the battery heat exchanger 7, and reducing the temperature of the coolant. However, in the air source heat pump two-stage compression working condition, the motor electronic control source heat pump working condition, and the battery source heat pump working condition, the second working medium flowing out of the battery heat exchanger 7 does not need to be throttled and cooled. In this embodiment, the battery heating two-way valve 13 and the battery refrigeration electronic expansion valve 12 are added. In the air source heat pump two-stage compression working condition, the motor electronic control source heat pump working condition, and the battery source heat pump working condition, the second working medium flows from the battery heating two-way valve 13 to the wind side heat exchanger 4 or the water-side heat exchanger 3. In the refrigeration working condition, the second working medium flows to the battery heat exchanger 7 through the battery refrigeration electronic expansion valve 12. In this manner, the energy efficiency of the high-pressure-stage compression device can be improved, thereby achieving the energy-saving function, and facilitating prolonging the mileage of the electric vehicle.

As shown in FIG. 1, the cascade heat pump system for an electric vehicle in this embodiment also includes an economizer 16. The first port of the economizer 16 communicates with one of the wind side heat exchanger 4 or the water-side heat exchanger 3. The second port of the economizer 16 communicates with the cabin heat exchanger 5 and the battery heat exchanger 7. The third port of the economizer 16 communicates with the high-pressure-stage compressor 1 through a one-way valve 35. The fourth port of the economizer 16 communicates with one of the wind side heat exchanger 4 or the water-side heat exchanger 3 through a two-way control valve 17. It is to be understood that the economizer 16 can make the second working medium enter the economizer 16 and be divided into two parts. One part of the second working medium is throttled and cooled in the manner of thermal expansion so as to lower the temperature of another part of the second working medium and make another part of the second working medium subcooled. In this manner, the stabilized subcooled liquid directly enters the air-side heat exchanger 4 or the water-side heat exchanger 3 to be evaporated. However, another part of the uncooled gaseous refrigerant re-enters the high-pressure-stage compressor 1 through the connection conduit between the economizer 16 and the high-pressure-stage compressor 1 to be continuously compressed to enter the circulation. The economizer 16 stabilizes the liquid second working medium in the manner of expansion refrigeration for increasing the system capacity and efficiency.

As shown in FIG. 1, the cascade heat pump system for an electric vehicle in this embodiment also includes a cabin heater 34 disposed on the cabin heat exchange member 6. It is to be understood that the cabin heater 34 can complementally heat when the entire cascade heat pump system for an electric vehicle has an insufficient heating capacity, ensuring the cabin to be stably heated when the cabin needs to be heated, ensuring the cabin to be at a more comfortable temperature, and improving the usage satisfaction of the user.

As shown in FIG. 1, the cascade heat pump system for an electric vehicle in this embodiment also includes a battery heater 22. The battery heater 22 is connected between the battery heat exchanger 7 and the battery heat exchanger member 20. It is to be understood that the battery heater 22 can complementally heat when the entire cascade heat pump system for an electric vehicle has an insufficient heating capacity, ensuring the battery to be stably heated when the battery needs to be heated, ensuring the battery to stably work, and prolonging the service life of the battery.

In the description of the specification, the description of reference terms such as "some embodiments" and "other embodiments" is intended to be included in at least one of embodiments or examples of the present disclosure in connection with characteristics, structures, materials or features described in this embodiment or example. In the specification, the illustrative description of the preceding terms does not necessarily refer to the same embodiment or example. Moreover, the described features, structures, materials, or characteristics may be combined in an appropriately manner in any one or more embodiments or examples.

The preceding are embodiments of the present disclosure. For those of ordinary skill in the art, according to the idea of the present disclosure, modifications may be made to the implementation and application scope of the present disclosure, and the content of this specification should not be construed as limiting the present disclosure.

What is claimed is:

1. A cascade heat pump system for an electric vehicle, comprising:
    a low-pressure-stage compression device comprising a low-pressure-stage compressor, a low-pressure-stage evaporator, a low-pressure expansion valve, and a low-pressure-stage intercooler connected in sequence, wherein the low-pressure-stage compression device is configured to enable a first working medium to circulate in the low-pressure-stage compression device;
    a high-pressure-stage compression device comprising a high-pressure-stage compressor, a high-pressure-stage four-way valve, an air-side heat exchanger, a water-side heat exchanger, a cabin heat exchanger, and a battery heat exchanger, wherein a compressor outlet of the high-pressure-stage compressor communicates with one of the air-side heat exchanger or the water-side heat exchanger, the air-side heat exchanger communicates with the cabin heat exchanger and the battery heat exchanger separately, the high-pressure-stage compression device is configured to enable a second working medium to circulate in the high-pressure-stage compression device, wherein the low-pressure-stage intercooler is configured to enable heat to exchange, in the low-pressure-stage intercooler, between the second working medium and the first working medium; and
    a functional heat exchange device comprising a motor heat exchange assembly, a heat exchange water tank, a battery heat exchange member, and a cabin heat exchange member, wherein
    a heat exchange inlet of the motor heat exchange assembly communicates with one of a heat exchange outlet of the heat exchange water tank or a heat exchange outlet of the battery heat exchange member, and a heat exchange outlet of the motor heat exchange assembly communicates with one of a heat exchange inlet of the heat exchange water tank or a heat exchange inlet of the cabin heat exchange member;
    a heat exchange inlet of the battery heat exchange member communicates with a heat exchange outlet of the battery heat exchanger, the heat exchange outlet of the battery heat exchange member communicates with one of a heat exchange inlet of the battery heat exchanger or the heat exchange inlet of the motor heat exchange assembly; and
    the heat exchange inlet of the cabin heat exchange member communicates with one of the heat exchange outlet of the motor heat exchange assembly or a heat exchange outlet of the cabin heat exchanger, and a heat exchange outlet of the cabin heat exchange member communicates with one of a heat exchange inlet of the cabin heat exchanger or the heat exchange inlet of the battery heat exchanger.

2. The cascade heat pump system for an electric vehicle according to claim 1, further comprising:
    a motor expansion water tank and a motor water pump connected in series, wherein an inlet of the motor water pump communicates with the motor expansion water tank and the motor heat exchange assembly, an outlet of the motor water pump communicates with one of the heat exchange water tank, the water-side heat exchanger, or the cabin heat exchange member.

3. The cascade heat pump system for an electric vehicle according to claim 2, further comprising:
a first three-way valve and a second three-way valve, wherein a first valve port of the first three-way valve communicates with the outlet of the motor water pump, a second valve port of the first three-way valve communicates with the heat exchange inlet of the heat exchange water tank, a third valve port of the first three-way valve communicates with a first valve port of the second three-way valve, and the first valve port of the first three-way valve switchably communicates with one of the second valve port of the first three-way valve or the third valve port of the first three-way valve; and a second valve port of the second three-way valve communicates with the heat exchange inlet of the cabin heat exchange member, a third valve port of the second three-way valve communicates with a heat exchange inlet of the water-side heat exchanger, and the first valve port of the second three-way valve switchably communicates with one of the second valve port of the second three-way valve or the third valve port of the second three-way valve.

4. The cascade heat pump system for an electric vehicle according to claim 1, further comprising:
a battery expansion water tank and a battery water pump, wherein an inlet of the battery water pump communicates with the battery expansion water tank and the battery heat exchanger, and an outlet of the battery water pump communicates with the battery heat exchange member.

5. The cascade heat pump system for an electric vehicle according to claim 2, further comprising:
a battery expansion water tank and a battery water pump, wherein an inlet of the battery water pump communicates with the battery expansion water tank and the battery heat exchanger; and an outlet of the battery water pump communicates with the battery heat exchange member.

6. The cascade heat pump system for an electric vehicle according to claim 3, further comprising:
a battery expansion water tank and a battery water pump, wherein an inlet of the battery water pump communicates with the battery expansion water tank and the battery heat exchanger; and an outlet of the battery water pump communicates with the battery heat exchange member.

7. The cascade heat pump system for an electric vehicle according to claim 1, further comprising:
a third three-way valve and a four-way control valve, wherein a first valve port of the third three-way valve communicates with the heat exchange outlet of the heat exchange water tank, a second valve port of the third three-way valve communicates with an evaporation inlet of the low-pressure-stage evaporator, a third valve port of the third three-way valve communicates with a first valve port of the four-way control valve, and the first valve port of the third three-way valve switchably communicates with one of the second valve port of the third three-way valve or the third valve port of the third three-way valve; and the first valve port of the four-way control valve communicates with the heat exchange outlet of the cabin heat exchange member through a cabin control valve, a second valve port of the four-way control valve communicates with the heat exchange inlet of the battery heat exchanger, a third valve port of the four-way control valve communicates with the heat exchange outlet of the battery heat exchange member, a fourth valve port of the four-way control valve communicates with the heat exchange inlet of the motor heat exchange assembly, the first valve port of the four-way control valve switchably communicates with one of the second valve port of the four-way control valve or the fourth valve port of the four-way control valve, and the third valve port of the four-way control valve switchably communicates with one of the second valve port of the four-way control valve or the fourth valve port of the four-way control valve.

8. The cascade heat pump system for an electric vehicle according to claim 2, further comprising:
a third three-way valve and a four-way control valve, wherein a first valve port of the third three-way valve communicates with the heat exchange outlet of the heat exchange water tank, a second valve port of the third three-way valve communicates with an evaporation inlet of the low-pressure-stage evaporator, a third valve port of the third three-way valve communicates with a first valve port of the four-way control valve, and the first valve port of the third three-way valve switchably communicates with one of the second valve port of the third three-way valve or the third valve port of the third three-way valve; and the first valve port of the four-way control valve communicates with the heat exchange outlet of the cabin heat exchange member through a cabin control valve, a second valve port of the four-way control valve communicates with the heat exchange inlet of the battery heat exchanger, a third valve port of the four-way control valve communicates with the heat exchange outlet of the battery heat exchange member, a fourth valve port of the four-way control valve communicates with the heat exchange inlet of the motor heat exchange assembly, the first valve port of the four-way control valve switchably communicates with one of the second valve port of the four-way control valve or the fourth valve port of the four-way control valve, and a third valve port of the four-way control valve switchably communicates with one of the second valve port of the four-way control valve or the fourth valve port of the four-way control valve.

9. The cascade heat pump system for an electric vehicle according to claim 3, further comprising:
a third three-way valve and a four-way control valve, wherein a first valve port of the third three-way valve communicates with the heat exchange outlet of the heat exchange water tank, a second valve port of the third three-way valve communicates with an evaporation inlet of the low-pressure-stage evaporator, a third valve port of the third three-way valve communicates with a first valve port of the four-way control valve, and the first valve port of the third three-way valve switchably communicates with one of the second valve port of the third three-way valve or the third valve port of the third three-way valve; and the first valve port of the four-way control valve communicates with the heat exchange outlet of the cabin heat exchange member through a cabin control valve, a second valve port of the four-way control valve communicates with the heat exchange inlet of the battery heat exchanger, a third valve port of the four-way control valve communicates with the heat exchange outlet of the battery heat exchange member, a fourth valve port of the four-way control valve communicates with the heat exchange inlet of the motor heat exchange assembly, the first valve port of the four-way control valve switchably communicates with one of the second valve port of the four-way control valve or the fourth valve port of the four-way control valve, and a third valve port of the four-way control valve switchably communicates with one of the second valve port of the four-way control valve or the fourth valve port of the four-way control valve.

10. The cascade heat pump system for an electric vehicle according to claim 1, further comprising:
a cabin expansion water tank and a cabin water pump, wherein an inlet of the cabin water pump communicates with the cabin expansion water tank and the cabin heat exchange member, and an outlet of the cabin water pump communicates with the cabin heat exchanger.

11. The cascade heat pump system for an electric vehicle according to claim 2, further comprising:
a cabin expansion water tank and a cabin water pump, wherein an inlet of the cabin water pump communicates with the cabin expansion water tank and the cabin heat exchange member, and an outlet of the cabin water pump communicates with the cabin heat exchanger.

12. The cascade heat pump system for an electric vehicle according to claim 3, further comprising:
a cabin expansion water tank and a cabin water pump, wherein an inlet of the cabin water pump communicates with the cabin expansion water tank and the cabin heat exchange member, and an outlet of the cabin water pump communicates with the cabin heat exchanger.

13. The cascade heat pump system for an electric vehicle according to claim 1, further comprising:
a fourth three-way valve and a fifth three-way valve, wherein a first valve port of the fourth three-way valve communicates with the high-pressure-stage four-way valve, a second valve port of the fourth three-way valve communicates with a heat exchange outlet of the low-pressure-stage intercooler, a third valve port of the fourth three-way valve communicates with the air-side heat exchanger and the water-side heat exchanger, and the first valve port of the fourth three-way valve switchably communicates with one of the second valve port of the fourth three-way valve or the third valve port of the fourth three-way valve; and a first valve port of the fifth three-way valve communicates with the cabin heat exchanger and the battery heat exchanger, a second valve port of the fifth three-way valve communicates with the air-side heat exchanger, a third valve port of the fifth three-way valve communicates with the water-side heat exchanger, and the first valve port of the fifth three-way valve switchably communicates with one of the second valve port of the fifth three-way valve or the third valve port of the fifth three-way valve.

14. The cascade heat pump system for an electric vehicle according to claim 2, further comprising:
a fourth three-way valve and a fifth three-way valve, wherein a first valve port of the fourth three-way valve communicates with the high-pressure-stage four-way valve, a second valve port of the fourth three-way valve communicates with a heat exchange outlet of the low-pressure-stage intercooler, a third valve port of the fourth three-way valve communicates with the air-side heat exchanger and the water-side heat exchanger, and the first valve port of the fourth three-way valve switchably communicates with one of the second valve port of the fourth three-way valve or the third valve port of the fourth three-way valve; and a first valve port of the fifth three-way valve communicates with the cabin heat exchanger and the battery heat exchanger, a second valve port of the fifth three-way valve communicates with the air-side heat exchanger, a third valve port of the fifth three-way valve communicates with the water-side heat exchanger, and the first valve port of the fifth three-way valve switchably communicates with one of the second valve port of the fifth three-way valve or the third valve port of the fifth three-way valve.

15. The cascade heat pump system for an electric vehicle according to claim 3, further comprising:
a fourth three-way valve and a fifth three-way valve, wherein a first valve port of the fourth three-way valve communicates with the high-pressure-stage four-way valve, a second valve port of the fourth three-way valve communicates with a heat exchange outlet of the low-pressure-stage intercooler, a third valve port of the fourth three-way valve communicates with the air-side heat exchanger and the water-side heat exchanger, and the first valve port of the fourth three-way valve switchably communicates with one of the second valve port of the fourth three-way valve or the third valve port of the fourth three-way valve; and a first valve port of the fifth three-way valve communicates with the cabin heat exchanger and the battery heat exchanger, a second valve port of the fifth three-way valve communicates with the air-side heat exchanger, a third valve port of the fifth three-way valve communicates with the water-side heat exchanger, and the first valve port of the fifth three-way valve switchably communicates with one of the second valve port of the fifth three-way valve or the third valve port of the fifth three-way valve.

16. The cascade heat pump system for an electric vehicle according to claim 1, further comprising:
an economizer, wherein a first port of the economizer communicates with one of the air-side heat exchanger or the water-side heat exchanger, a second port of the economizer communicates with the cabin heat exchanger and the battery heat exchanger, a third port of the economizer communicates with the high-pressure-stage compressor through a one-way valve, and a fourth port of the economizer communicates with one of the air-side heat exchanger or the water-side heat exchanger through a two-way control valve.

17. The cascade heat pump system for an electric vehicle according to claim 2, further comprising:
an economizer, wherein a first port of the economizer communicates with one of the air-side heat exchanger or the water-side heat exchanger, a second port of the economizer communicates with the cabin heat exchanger and the battery heat exchanger, a third port of the economizer communicates with the high-pressure-stage compressor through a one-way valve, and a fourth port of the economizer communicates with one of the air-side heat exchanger or the water-side heat exchanger through a two-way control valve.

18. The cascade heat pump system for an electric vehicle according to claim 3, further comprising:
an economizer, wherein a first port of the economizer communicates with one of the air-side heat exchanger or the water-side heat exchanger, a second port of the economizer communicates with the cabin heat exchanger and the battery heat exchanger, a third port of the economizer communicates with the high-pressure-stage compressor through a one-way valve, and a fourth port of the economizer communicates with one of the air-side heat exchanger or the water-side heat exchanger through a two-way control valve.

19. The cascade heat pump system for an electric vehicle according to claim 1, further comprising a cabin heater disposed on the cabin heat exchange member.

20. The cascade heat pump system for an electric vehicle according to claim 1, further comprising a battery heater connected between the battery heat exchanger and the battery heat exchange member.

\* \* \* \* \*